(12) United States Patent
Cloots et al.

(10) Patent No.: US 10,549,508 B2
(45) Date of Patent: Feb. 4, 2020

(54) LAMINATED SAFETY GLASS

(71) Applicant: AGFA NV, Mortsel (BE)

(72) Inventors: Tom Cloots, Mortsel (BE); Johan Loccufier, Mortsel (BE); Guido Fransen, Mortsel (BE)

(73) Assignee: AGFA NV, Mortsel (BE)

( * ) Notice: Subject to any disclaimer, the term of this patent is extended or adjusted under 35 U.S.C. 154(b) by 289 days.

(21) Appl. No.: 15/100,671

(22) PCT Filed: Dec. 9, 2014

(86) PCT No.: PCT/EP2014/076982
§ 371 (c)(1),
(2) Date: Jun. 1, 2016

(87) PCT Pub. No.: WO2015/086564
PCT Pub. Date: Jun. 18, 2015

(65) Prior Publication Data
US 2016/0303831 A1    Oct. 20, 2016

(30) Foreign Application Priority Data
Dec. 12, 2013 (EP) .................................. 13196873

(51) Int. Cl.
*B32B 17/00* (2006.01)
*B32B 17/10* (2006.01)
*B32B 37/06* (2006.01)
*B60J 3/00* (2006.01)

(52) U.S. Cl.
CPC .. *B32B 17/10266* (2013.01); *B32B 17/10036* (2013.01); *B32B 37/06* (2013.01); *B60J 3/007* (2013.01); *B32B 2605/006* (2013.01); *B32B 2605/08* (2013.01)

(58) Field of Classification Search
CPC ................................................ B23B 17/10266
See application file for complete search history.

(56) References Cited

U.S. PATENT DOCUMENTS

| | | | |
|---|---|---|---|
| 5,882,370 A | 3/1999 | Garner et al. | |
| 2001/0018169 A1* | 8/2001 | Sampei | G03C 1/49881 430/350 |
| 2001/0055490 A1* | 12/2001 | Oyamada | G03C 1/49872 396/564 |
| 2004/0234735 A1* | 11/2004 | Reynolds | B32B 17/10036 428/204 |

(Continued)

FOREIGN PATENT DOCUMENTS

| | | | | |
|---|---|---|---|---|
| EP | 0363790 A2 * | 4/1990 | | G03F 7/0285 |
| EP | 2 368 859 A1 | 9/2011 | | |

(Continued)

OTHER PUBLICATIONS

Official Communication issued in International Patent Application No. PCT/EP2014/076982, dated Apr. 9, 2015.

*Primary Examiner* — Robert A Vetere
(74) *Attorney, Agent, or Firm* — Keating and Bennett, LLP

(57) ABSTRACT

A method for producing laminated safety glass includes the steps of applying imagewise a thermally reducible composition including a organic metal salt on a glass surface or a thermoplastic polymeric surface, and heating at least the imagewise applied thermally reducible composition to form a metal from the organic metal salt.

9 Claims, 4 Drawing Sheets

(56) References Cited

U.S. PATENT DOCUMENTS

| | | | | |
|---|---|---|---|---|
| 2006/0130700 A1* | 6/2006 | Reinartz | .............. | B41M 5/0023 |
| | | | | 106/31.92 |
| 2008/0206504 A1* | 8/2008 | Hayes | ..................... | B32B 17/10 |
| | | | | 428/38 |
| 2014/0377580 A1* | 12/2014 | Manz | ................ | B32B 17/10036 |
| | | | | 428/623 |

FOREIGN PATENT DOCUMENTS

| | | |
|---|---|---|
| JP | 2010-138008 A | 6/2010 |
| WO | 2005/118286 A2 | 12/2005 |
| WO | 2013/127563 A1 | 9/2013 |

\* cited by examiner

LAMINATED SAFETY GLASS

CROSS-REFERENCE TO RELATED APPLICATIONS

This application is a 371 National Stage Application of PCT/EP2014/076982, filed Dec. 9, 2014. This application claims the benefit of European Application No. 13196873.7, filed Dec. 12, 2013, which is incorporated by reference herein in its entirety.

BACKGROUND OF THE INVENTION

1. Field of the Invention

The present invention relates to laminated safety glass and the manufacturing thereof, especially for automotive applications.

2. Description of the Related Art

Laminated glass is a type of safety glass that holds together when shattered. In the event of breaking, it is held in place by an interlayer, between its two or more layers of glass. The interlayer keeps the layers of glass bonded even when broken, and its high strength prevents the glass from breaking up into large sharp pieces, thereby creating a characteristic "spider web" cracking pattern when the impact is not enough to completely pierce the glass.

This safety glass is typically used as a windshield for the front window of a vehicle. These windshields are often glued into the vehicle frame by an adhesive, which necessitates protective measures against degradation of the adhesive over time, e.g. by UV light or acid rain. For the latter, a rubber seal (28 in FIG. 3) is often used to prevent moisture from reaching the adhesive. Protection against UV light is obtained by a UV light blocking border (3 in FIG. 1), which usually has a black colour.

In state-of-the-art manufacturing processes (see FIG. 4) of automotive laminated safety glass, the black UV light blocking border is applied by screen printing an enamel ink on a flat windshield shaped glass layer 42 before gravity-sag shaping in a long tunnel oven or furnace 35. In this furnace, temperatures above 600° C. are used to bend the glass layer under its own weight and simultaneously also fire the enamel ink which generally consists of 50 to 85 wt % of low melting glass frit fluxes, 10 to 40 wt % of inorganic pigments and other additive oxides, sulphides or metals. Pigments often used for black colour development include copper chromite spinel $CuCr_2O_4$ and chrome iron nickel spinel $(Ni,Fe)(Cr,Fe)_2O_4$. Typical enamels are disclosed by, for example, EP 2368859 A (FERRO CORP). Sag bending is performed by shaping the glass layers as matched pairs, in order to avoid later lamination problems in the autoclave 39.

In automobile design, improved aerodynamics and visibility require more glass surface area with more complex shapes. Also, lighter vehicle weight requirements for improved fuel efficiencies are resulting in thinner glass. As gravity-sag bending is unable to form severe bends, the press bend technology or pressure forming technology was developed. One bent glass layer at a time is formed by lower and upper moulds, as such press bend forming operations allow precise shape control, more severe and complex shapes, and faster production rates. An apparatus for press bending glass layers is disclosed in e.g. U.S. Pat. No. 5,882,370 (PILKINGTON GLASS).

During the pressing operation, the enamel is in direct contact with a press mould or cloth thereon in the hot zone of the furnace, making it vulnerable to scratches and abrasion. Lead based glass frit fluxes, such as $PbO—B_2O_3—SiO_2$, ensure good durability but are today limited in use by environmental legislation.

US 2008206504 (DUPONT) discloses a process of preparing decorative safety glass comprising a coated image-bearing rigid sheet: (a) providing a rigid sheet; (b) printing an image on the rigid sheet so as to produce an image-bearing rigid sheet containing an image-bearing side; and (c) coating an adhesion promoter on the image-bearing side and over the image to produce a coated image-bearing rigid sheet containing a coated image-bearing side. It was found that printing the UV light blocking border with an inkjet ink, e.g. a UV curable black inkjet ink containing carbon black, not only caused adhesion problems but also failed to reach the desired opacity for effective UV protection of an adhesive with which the laminated safety glass is glued into a vehicle frame.

JP 2010138008 (BRIDGESTONE CORP) discloses a laminated safety glass wherein an intermediate film for decorative laminated glass can be manufactured from a resin composition containing the lubricating agents stearic acid and zinc stearate.

Hence, there is still a need for an improved laminated safety glass that can be manufactured by press bending without deterioration of physical properties, like opacity (UV light blocking), adhesive bond strength and glass strength.

SUMMARY OF THE INVENTION

The above problems are addressed by a simplified manufacturing process of laminated safety glass wherein the enamel on the outside of a glass layer is replaced by a thermally reducible composition including a organic metal salt and a reducing agent for the organic metal salt located between the glass layers. Thermal reduction, i.e. heating for a specific time, of the thermally reducible composition is performed after the press bending or sag bending, preferably either on the interlayer (43) prior to assembly with the inner and outer glass layers (36, 44) or in the autoclave (39).

An advantage of performing the thermal reduction after press or sag bending is that production losses are minimized since the absence of enamel allows full recycling of the glass. Also no financial loss of printing UV light blocking borders and areas is incurred.

Since the UV light blocking borders and areas are located between the inner and outer glass layers (36, 44) also no scratching or abrasion is possible during the manufacturing process of laminated safety glass and thereafter.

Further objects of the invention will become apparent from the description hereinafter.

DETAILED DESCRIPTION OF THE PREFERRED EMBODIMENTS

Definitions

Figure 1:
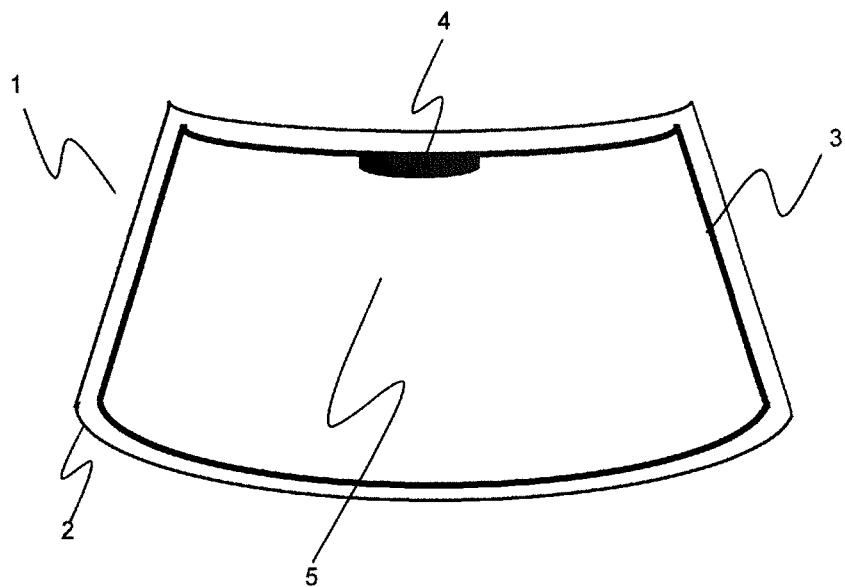
FIG. 1 shows a top view of a windshield 1 wherein a laminated glass 2 is has a UV light blocking border 3 prepared from an enamel ink printed thereon around a central part of the windshield 5. A broader area 4 is applied for protecting the adhesive of the rear-view mirror inside the vehicle.
Figure 2:
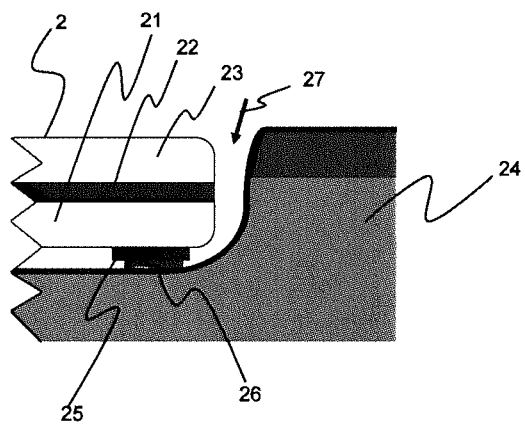
FIG. 2 shows a cross section of a windshield according to FIG. 1 glued with an adhesive 26 into a vehicle frame 24. The laminated glass 2 consists of an interlayer 22 between an outer glass layer 23 and an inner glass layer 21, having an enamel UV light blocking border 25. The arrow shows the acid rain penetration 27 which degrades the adhesive 26 over time.
Figure 3:
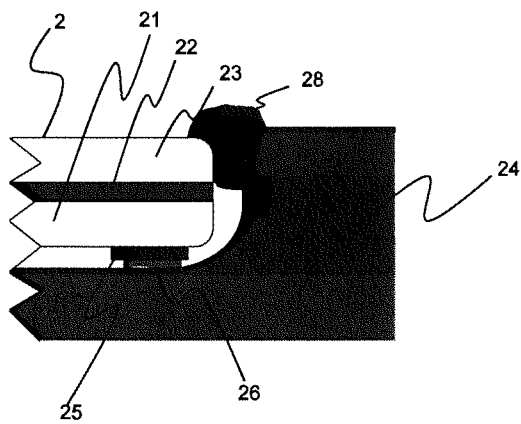
FIG. 3 is identical to FIG. 2 except that the acid rain penetration 27 (see FIG. 2) is prevented by a rubber seal 28.
Figure 4:
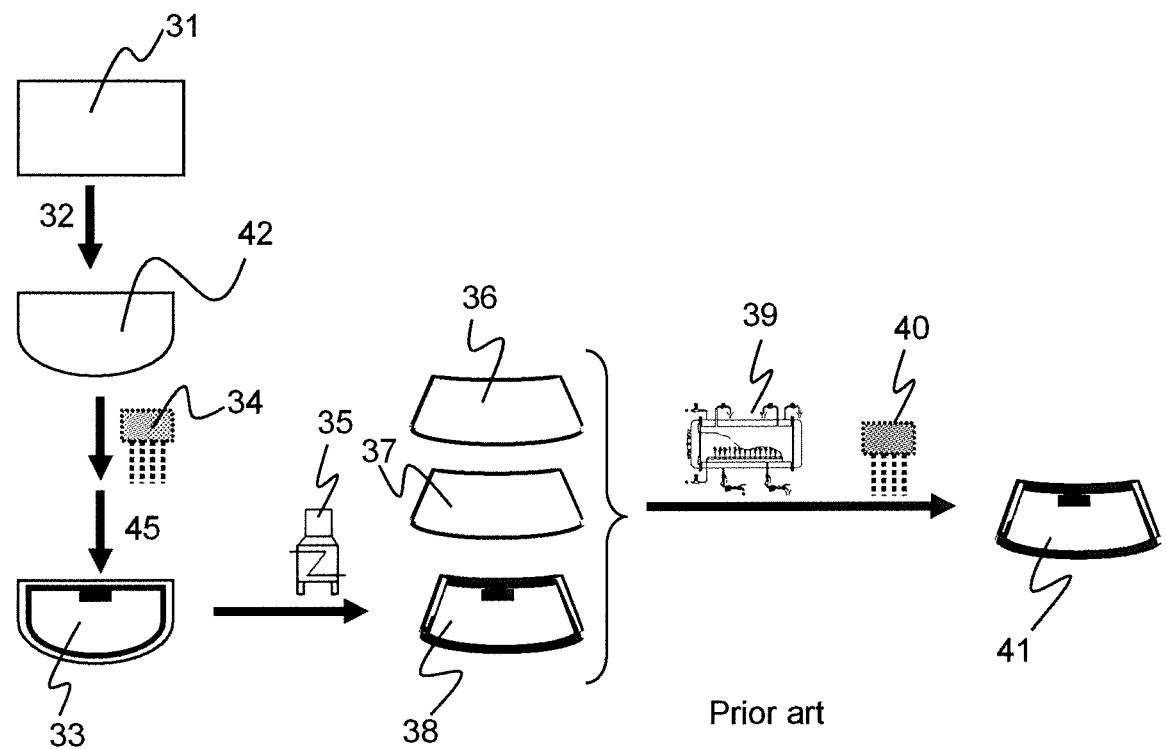
FIG. 4 is a schematic representation of a state-of-the-art manufacturing process for automotive laminated safety glass. Raw glass 31 is marked up and cut 32 into a flat windshield shaped glass layer 42, which is then cleaned 34 and printed with an enamel ink 45 to result in an enamel ink printed inner glass layer 33. The latter undergoes bending in a furnace 35 to produce a bent enamel ink printed inner glass layer 38. Under vacuum an assembly is made of a bent outer glass layer 36, an interlayer 37, and the bent enamel ink printed inner glass layer 38, which is then fused together in an autoclave 39. A ready-to-use windshield 41 is obtained after a cleaning step 40.
Figure 5:
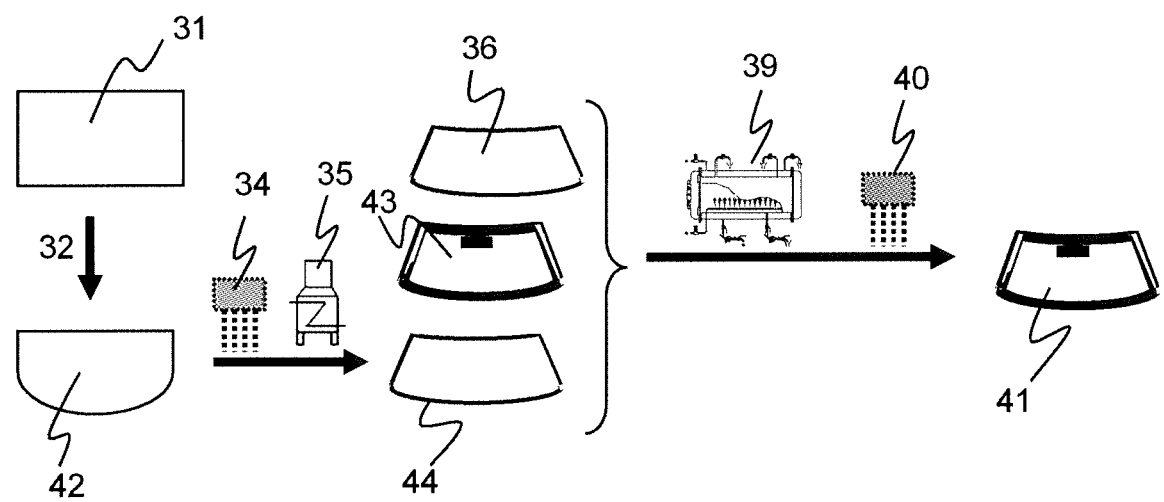
FIG. 5 is a schematic representation of a simplified manufacturing process for automotive laminated safety glass in accordance with the present invention. Raw glass 31 is marked up and cut 32 into a flat windshield shaped glass layer 42, which is then cleaned 34 and bent in a furnace 35 into a unprinted inner glass layer 44. Under vacuum an assembly is made of a bent outer glass layer 36, a printed interlayer 43 printed with a thermally reducible composition, and a bent unprinted inner glass layer 44, which is then fused together in an autoclave 39. A ready-to-use windshield 41 is obtained after a cleaning step 40.
Figure 6:
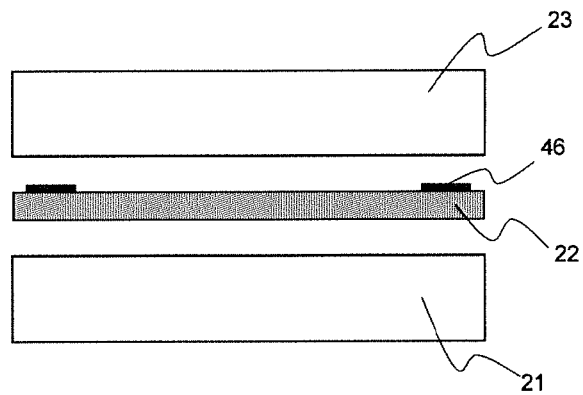
FIG. 6 is a cross section representation of an assembly of an outer glass layer 23, an interlayer 22 having a thermally reducible composition 46 on its surface and an inner glass layer 22.
Figure 7:
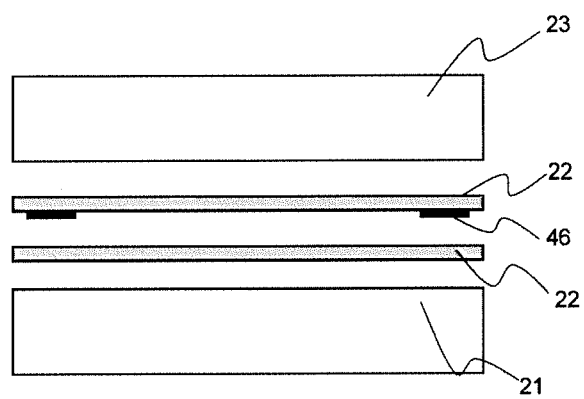
FIG. 7 is a cross section representation of an assembly of an outer glass layer 23, a first interlayer 22 having a thermally reducible composition 46 on its surface, a second interlayer 22 and an inner glass layer 22.
Figure 8:
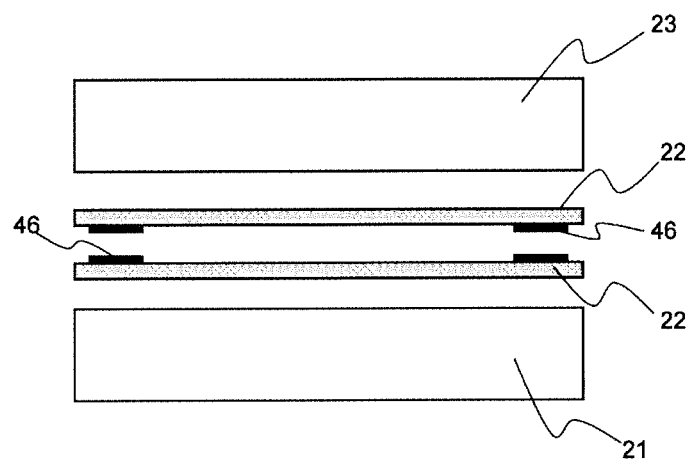
FIG. 8 is a cross section representation of an assembly of an outer glass layer 23, two interlayers 22 each having a thermally reducible composition 46 on its surface and an inner glass layer 22.
Figure 9:
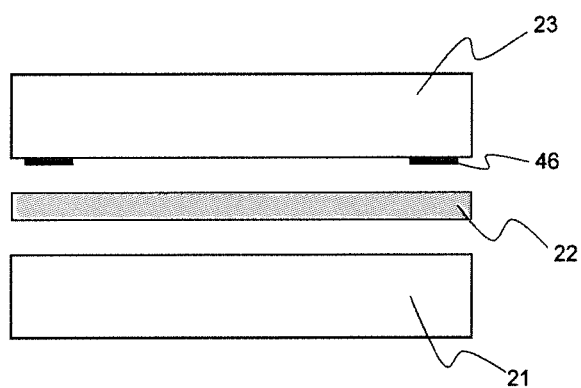
FIG. 9 is a cross section representation of an assembly of an outer glass layer 23 having a thermally reducible composition 46 on its inner surface, an interlayer 22 and an inner glass layer 22.
Figure 10:
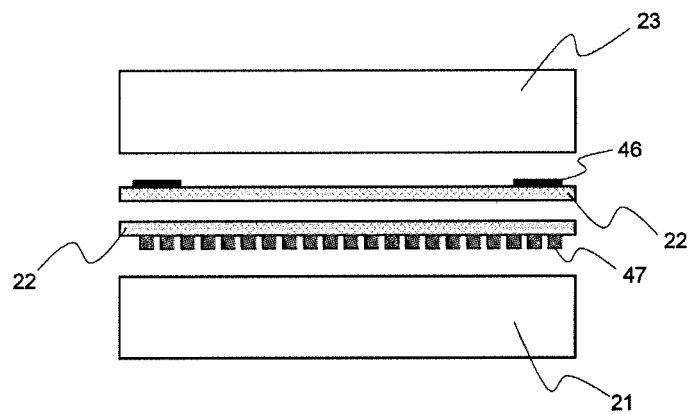
FIG. 10 is a cross section representation of an assembly of an outer glass layer 23, a first interlayer 22 having a thermally reducible composition 46 on its surface, a second interlayer 22 having a functional conductive pattern 47 on its surface and an inner glass layer 22.

A thermoplastic polymer sheet is a polymer sheet that becomes pliable or mouldable above a specific temperature, and returns to a solid state upon cooling.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —$NO_2$.

Methods for Manufacturing Laminated Safety Glass

A method for manufacturing laminated safety glass according to a preferred embodiment of the invention includes the steps of: a) applying imagewise a thermally reducible composition including a organic metal salt on a surface selected from the group consisting of a glass surface and a thermoplastic polymeric surface; and b) heating at least the imagewise applied thermally reducible composition to form a metal from the organic metal salt.

The thermoplastic polymeric surface may be the surface of the interlayer. This allows preparing interlayers printed with the desired UV light blocking borders and areas prior to their use in the assembly of the laminated glass. The printed UV light blocking borders and areas may even be thermally reduced on the interlayer prior to their use in the assembly of the laminated glass. Already thermally reduced printed UV light blocking borders and areas allow easier positioning between the inner and outer glass layers (36, 44).

In an alternative preferred embodiment of the manufacturing method, the heating step b) is performed during the lamination of an assembly of, in order, an inner glass layer, an interlayer and an outer glass layer, wherein the thermally reducible composition is in contact with the interlayer having a thermoplastic polymeric surface. Such a heating step is usually performed in an autoclave 39 after applying a vacuum to remove air trapped between the glass layers. The heating step for thermal reduction is preferably performed at a temperature between 100° C. and 300° C., more preferably between 120° C. and 250° C., and most preferably between 130° C. and 180° C. The pressure in the autoclave is preferably between 150 psi (11.3 bar) and 250 psi (18.8 bar). The residence time in the autoclave is preferably from 10 to 50 minutes. The vacuum to remove air is preferably 689 to 711 mm Hg. For achieving this vacuum the assembly is often placed in a vacuum bag which may be sealed.

The laminated safety glass may also be produced through non-autoclave processes. Such non-autoclave processes are disclosed, for example, within U.S. Pat. No. 3,234,062 (PITTSBURGH PLATE GLASS), U.S. Pat. No. 3,852,136 (GLAVERBEL), U.S. Pat. No. 4,341,576 (PPG INDUSTRIES), U.S. Pat. No. 4,385,951 (PPG INDUSTRIES), U.S. Pat. No. 4,398,979 (PPG INDUSTRIES), U.S. Pat. No. 5,536,347 (MONSANTO), U.S. Pat. No. 5,853,516 (TAMGLASS), U.S. Pat. No. 6,342,116 (SAINT GOBAIN), U.S. Pat. No. 5,415,909 (SEKISUI CHEMICAL), US 2004182493 (CARDINAL LG COMPANY), EP 1235683 A (HUELS TROISDORF), WO 91/01880 A (MORTIMORE) and WO 03/057478 A (SOLUTIA). Generally, the non-autoclave processes include heating the assembly and the application of vacuum, pressure or both. For example, the assembly may be successively passed through heating ovens and nip rolls.

There is no real limitation for the technique used to apply the thermally reducible composition. Preferred application techniques include screen printing, flexographic printing and inkjet printing, with the latter being most preferred as it allows variable printing, meaning that fast changes in the layout of the UV light blocking borders and areas are possible during manufacturing of laminated safety glass, e.g. for different models of a vehicle.

In one preferred embodiment, the thermally reducible composition is deposited on the glass surface of the inner glass layer or the outer glass layer making contact with the interlayer. In the latter case, the thermally reducible composition includes preferably a thermoplastic polymer, such as polyvinylbutyral.

A vehicle identification number (VIN) is a unique code including a serial number, used by the automotive industry to identify individual motor vehicles, towed vehicles, motorcycles, scooters and mopeds as defined in ISO 3833. Today, the VIN code is engraved by using a stencil and an acidic etching paste onto the windshield and windows. As inkjet printing allows variable data printing, the VIN code can be printed in the method for manufacturing laminated safety glass. The advantage thereof is that, after the manufacturing of a windshield, the VIN code is located between the inner glass layer or the outer glass layer, making it inaccessible for tampering.

Laminated Safety Glass

A laminated safety glass according to a preferred embodiment of the present invention includes at least, in order, an inner glass layer, an interlayer and an outer glass layer, wherein the interlayer is in contact with a metal and an organic acid both derived from an organic metal salt by thermally reducing the metal ion in the organic metal salt. In some preferred embodiments, one of the glass layers, preferably an inner glass layer 21 may be replaced by a polycarbonate or polymethacrylate sheet. However preferably the interlayer has on both sides at least one glass layer.

The laminated safety preferably includes at least one interlayer between at least two glass layers, but a plurality of interlayers or more than two glass layers may also be used. For example, this may be the case for aircraft windows in order to improve the strength thereof.

It may also be advantageous during safety glass manufacturing for logistic reasons to use one interlayer for the UV light blocking border and to use a second interlayer carrying a conductive pattern, e.g. an antenna or a heating wire pattern for defogging or defrosting.

Alternatively, according to a preferred embodiment, one interlayer may be used wherein the metallic UV light blocking border is physically separated by the interlayer from a conductive pattern, meaning that the metallic UV light blocking border is located on one side of the interlayer and that the conductive pattern is located on the opposite side of the interlayer. The conductive pattern is preferably selected from the group consisting of a defrosting heating wire pattern and an antenna.

The metallic UV light blocking layer and areas preferably have an optical density of at least 3.0, more preferably at least 3.5 and most preferably at least 4.0.

The term "glass" is meant to include not only window glass, plate glass, silicate glass, sheet glass, low iron glass, and float glass, but also includes coloured glass, specialty glass which includes ingredients to control, for example, solar heating, coated glass with, for example, sputtered metals, such as silver or indium tin oxide, for solar control purposes, E-glass, Toroglass, Solex™ glass and the like. Such specialty glasses are disclosed in, for example, U.S. Pat. No. 4,615,989 (SCHOTT GLASWERKE), U.S. Pat. No. 5,173,212 (SCHOTT GLASWERKE), U.S. Pat. No. 5,264,286 (ASAHI GLASS), U.S. Pat. No. 6,150,028 (SAINT GOBAIN), U.S. Pat. No. 6,340,646 (NIPPON SHEET GLASS), U.S. Pat. No. 6,461,736 (NIPPON SHEET GLASS) and U.S. Pat. No. 6,468,934 (NIPPON SHEET GLASS). The glass may also include frosted or etched glass sheet. Frosted and etched glass sheets are articles of commerce and are well disclosed within the common art and literature. The type of glass to be selected for a particular laminate depends on the intended use.

The laminated safety glass can be advantageously used in a vehicle. When it is glued into the vehicle frame, the metallic UV light blocking layer protects the adhesive against degradation by sun light (heat and UV light). In a preferred embodiment, the vehicle is selected from the group consisting of an aircraft, a car, a bus, a truck, a locomotive and a tram.

The laminated safety glass is not only useful for windshields in vehicles but can also be advantageously used, e.g. for personal security and reduction of theft, in the rear window and the side glazings of a vehicle and even in buildings to save energy or for solar control glazing or acoustic glazing.

Interlayer

The main function of an interlayer is to hold two or more layers of glass together even when shattered. The adhesion of the interlayer is usually tailored to the needs of the lamination process.

An interlayer is typically made with a relatively thick polymer film or sheet, which exhibits toughness and bondability to provide adhesion to the glass in the event of a crack or crash. Preferred polymeric interlayers possess a combination of characteristics including very high optical clarity, low haze, high impact resistance, high penetration resistance, excellent ultraviolet light resistance, good long term thermal stability, excellent adhesion to glass and other rigid polymeric sheets, low ultraviolet light transmittance, low moisture absorption, high moisture resistance, excellent long term weatherability, among other requirements.

A polymeric interlayer sheet preferably has a thickness between 0.25 mm and 6.40 mm to ensure adequate penetration resistance.

The polymeric sheet is preferably formed by extrusion.

The polymeric interlayer may have a smooth surface, but preferably has a roughened surface to effectively allow most of the air to be removed from between the surfaces of the assembly during the lamination process. This can be accomplished, for example, by mechanically embossing the sheet after extrusion or by melt fracture during extrusion of the sheet and the like.

Widely used interlayer materials utilized currently include complex, multicomponent compositions based on poly(vinyl acetal) (preferably poly(vinyl butyral) (PVB)), polyurethane (PU), polyvinylchloride (PVC), linear low density polyethylenes (preferably metallocene-catalyzed), poly(ethylene-co-vinyl acetate) (EVAc), polymeric fatty acid polyamides, polyester resins, such as poly(ethylene terephthalate), silicone elastomers, epoxy resins, elastomeric polycarbonates, ionomers (neutralized ethylene acid copolymer which comprises copolymerized residues of ethylene and copolymerized residues of [alpha],[beta]-unsaturated carboxylic acid) and the like.

In a preferred embodiment, the polymeric interlayer sheet is selected from the group consisting of poly(vinyl acetal) sheets and poly(ethylene-co-vinyl acetate) sheets. For reasons of compatibility with the thermally reducible composition, an interlayer of polyvinyl butyral or an interlayer having at least a surface of polyvinyl butyral is preferred.

Suitable commercially available interlayer films include S-LEC™ interlayer films from SEKISUI, Butacite™ interlayers from DUPONT, Saflex™ and Vanceva™ interlayers from Eastman-Solutia, Trofisol™ interlayers from Kuraray and Winlite™ interlayers from Chang Chun Petrochemicals Ltd.

Suitable commercially available interlayer films including polyurethanes include Duraflex™ films from Bayer MaterialScience.

If conductive patterns or the like are to be incorporated into the safety glass, preferred interlayers include beside PVB, thermoplastic glass lamination materials today such as EVA (EthylVinylAcetate) and TPU (thermoplastic Polyurethane). The adhesion of PVB/TPU and EVA is not only high to glass but also to Polyester (PET) Interlayer. Since 2004 metallized and electroconductive PET Interlayers are used as substrate for light emitting diodes and laminated to or between glass. Such laminated safety glass may have a construction according to Table 1.

TABLE 1

| Top layer | Glass |
| --- | --- |
| Interlayer | Transparent thermoplastic material like TPU, PVB or EVA |
| Interlayer | LED (light emitting diodes)on transparent conductive Polymer |
| Interlayer | Transparent thermoplastic material like TPU, PVB or EVA |
| Bottom layer | Glass |

Other suitable laminated safety glass constructions include those disclosed on page 33 of WO 2008/141258 (DUPONT) and those adapted for a Head Up Display (HUD) system.

The interlayer may be a clear interlayer or may include a colorant to provide a uniformly coloured interlayer. For example, Butacite™ B51 and B52 grades from DUPONT can have an azure blue or a grey colour. Instead of uniform coloured interlayers, also a gradient tinted interlayer can be used. The latter can be used as automotive windshield tint bands to protect the driver's eyes from the sun glare.

The interlayer may include an adhesion promoter, such as an aminosilane. Preferred silane adhesion promoters are selected from the group consisting of vinyltriethoxysilane, vinyltrimethoxysilane, vinyltris(beta-methoxyethoxy)silane, gamma-methacryloxypropyltrimethoxysilane, beta-(3,4-epoxycyclohexyl)ethyltrimethoxysilane, gamma-glycidoxypropyltrimethoxysilane, gamma-glycidoxypropylmethyldiethoxysilane, vinyltriacetoxysilane, gamma-mercaptopropyltrimethoxysilane, (3-aminopropyl)trimethoxysilane, (3-aminopropyl)triethoxysilane, N-beta-(aminoethyl)-gamma-aminopropyltrimethoxysilane, N-(beta-aminoethyl)gamma-aminopropylmethyldimethoxysilane, aminoethylaminopropyl silane triol homopolymer, vinylbenzylaminoethylaminopropyltrimethoxysilane, bis(trimethoxysilylpropyl)amine, and mixtures thereof.

The interlayer may further include, for example, plasticizers, processing aides, flow enhancing additives, lubricants, pigments, dyes, flame retardants, impact modifiers, nucleating agents to increase crystallinity, antiblocking agents such as silica, thermal stabilizers, ultraviolet (UV) absorbers, antioxidants, UV stabilizers, thermal stabilizers, dispersants, surfactants, chelating agents, coupling agents, adhesives, primers and the like.

Thermally Reducible Compositions

The thermally reducible composition, which is imagewise applied on a glass surface or a thermoplastic polymeric surface, includes a organic metal salt. This organic metal salt is reduced under heating to form a metal and an organic acid as byproduct.

Two types of thermally reducible compositions can be distinguished: a substantially light insensitive thermally reducible composition (ITR) and a light sensitive thermally reducible composition (STR). The latter includes a silver halide that forms a silver speck upon exposure. This exposure can be performed during the manufacturing of the STR or even by working in non darkened light conditions, e.g. day light or neon light, during the manufacturing of the laminated safety glass. An explicit light exposure of the STR deposited on the interlayer is also possible.

The use of an STR type thermally reducible composition allows to use much milder conditions of temperature and time for reducing the metal ion of the organic metal salt to its metallic form.

For accelerating thermal reduction, a reducing agent may be used which is capable of reducing the metal ion of the organic metal salt to its metallic form.

Stabilizers may be added to improve the shelf-life stability of the thermally reducible compositions and also to control the reduction speed so that a desired colour, usually a neutral black colour for its hiding power, can be obtained.

It is apparent that the use of stabilizers, reducing agents and the use of an STR or an ITR type thermally reducible composition allows to cover a wide range of heat treatment conditions. By controlling the amount and type of these ingredients the reactivity of the thermally reducible composition can be controlled and tailored to the specific conditions used in the manufacturing of laminated safety glass. If the thermally reducible composition is applied to a porous interlayer, such as a polyvinylbutyral sheet, then usually larger amounts of stabilizers and reducing agents are necessary then if the thermally reducible composition was applied to a glass surface.

A colorant may be added, for example a blue or cyan colorant to render a brownish black colour of reduced metal to a neutral black colour. However, the use of a tone modifying agent may make the addition of a colorant obsolete. A tone modifying agent interferes during the reduction of the organic metal salt by forming metal complexes thereby having an influence on the reduced metal morphology which determines the colour. For example, in an ITR composition using a silver behenate as organic metal salt, the silver morphology is usually that of silver nano particles, while in an STR composition the silver morphology is usually that of filamentous silver.

The thermally reducible composition may contain other additives such as free fatty acids, surface-active agents, antistatic agents, ultraviolet light absorbing compounds, white light reflecting and/or ultraviolet radiation reflecting pigments, silica, colloidal silica, fine polymeric particles and/or optical brightening agents.

The additives and the other components may be dissolved or dispersed in the thermally reducible composition by a solvent. The solvent can be water or one or more organic solvents. When water is used the organic metal salt is usually dispersed by a dispersant having surfactant like properties which can cause adhesion problems. Therefore, preferably the solvent is an organic solvent such as an alcohol, a ketone or an ester. Among these organic solvents, 2-butanone and ethyl acetate are preferred. The latter represent a good compromise between evaporation speed and ignition or explosion danger in printing the thermally reducible composition. 2-Butanone and ethyl acetate are also very compatible with many thermoplastic polymers used in laminated safety glass.

Organic Metal Salts

The organic metal salt can be an organic iron salt or another heavy organic metal salt, but is preferably a organic silver salt, more preferably a substantially light-insensitive organic silver salt. The thermal reduction of a organic silver salt results in silver. Silver being a noble metal is very resistant to corrosion and oxidation in moist air, which can be exploited advantageously in the laminated safety glass manufacturing process.

The advantage of using substantially light-insensitive organic silver salt is found in the improved shelf-life stability of the thermally reducible composition before actual use in the safety glass manufacturing.

Suitable iron organic salts are elected from the group containing iron behenate, iron stearate, iron palmitate, iron myristate, iron dodecylate, iron-zinc stearate, iron-zinc montanate, iron-zinc behenate, iron-calcium behenate, iron-aluminium behenate and iron-magnesium behenate.

Silver salts of organic acids including silver salts of long-chain carboxylic acids are preferred. The chains typically contain 10 to 30, and preferably 15 to 28, carbon atoms. Suitable organic silver salts include silver salts of organic compounds having a carboxylic acid group. Examples thereof include a silver salt of an aliphatic carboxylic acid or a silver salt of an aromatic carboxylic acid. Preferred examples of the silver salts of aliphatic carboxylic acids include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Preferably, at least silver behenate is used alone or in mixtures with other silver carboxylates.

Suitable silver salts of aromatic carboxylic acid and other carboxylic acid group-containing compounds include, but are not limited to, silver benzoate, silver substituted-benzoates (such as silver 3,5-dihydroxy-benzoate, silver o-methylbenzoate, silver m-methylbenzoate, silver p-methylbenzoate, silver 2,4-dichlorobenzoate, silver acetamidobenzoate, silver p-phenylbenzoate), silver tannate, silver phthalate, silver terephthalate, silver salicylate, silver phenylacetate, and silver pyromellitate.

Preferred substantially light-insensitive organic silver salts used in the present invention are silver salts of aliphatic carboxylic acids known as fatty acids, wherein the aliphatic carbon chain has preferably at least 12 C-atoms, e.g. silver laurate, silver palmitate, silver stearate, silver hydroxystearate, silver oleate and silver behenate, which silver salts are also called "silver soaps".

The term organic silver salt for the purposes of the present invention also includes mixtures of organic silver salts.

In a particularly preferred embodiment, the organic silver salt is selected from the group consisting of silver behenate, silver stearate, silver palmitate, silver laurate or mixtures thereof.

The amount of organic silver salt depends on the type of thermally reducible composition, the desired opacity, e.g. an optical density of 3.0 or higher and the amount of the thermally reducible composition deposited on the glass surface and a thermoplastic polymeric surface. A thermally reducible composition containing a silver halide, i.e. a STR composition, requires a higher amount of silver organic salt than an ITR composition, but has the advantage of a broader latitude for temperature and time conditions used to reduce the silver organic salt.

The total amount of silver organic salt applied in manufacturing laminated safety glass is preferably in the range of 0.010 to 0.040 mol/m$^2$. With an amount of less than 0.010 mol/m$^2$ insufficient optical density is obtained, while the extra optical density versus additional cost is minimal above 0.040 mol/m$^2$.

Silver Halides

The silver halide renders the thermally reducible composition light sensitive.

The silver halide may be any light sensitive silver halide such as silver bromide, silver iodide, silver chloride, silver bromoiodide, silver chlorobromoiodide, silver chlorobromide etc. The silver halide may be in any form which is photosensitive including, but not limited to, cubic, orthorhombic, tabular, tetrahedral, octagonal etc. and may have epitaxial growth of crystals thereon.

The silver halide used in the present invention may be employed without modification. However, it may be chemically sensitized with a chemical sensitizing agent such as a compound containing sulphur, selenium, tellurium etc., or a compound containing gold, platinum, palladium, iron, ruthenium, rhodium or iridium etc., a reducing agent such as a tin halide etc., or a combination thereof. The details of these procedures are described in T. H. James, "The Theory of the Photographic Process", Fourth Edition, Macmillan Publishing Co. Inc., New York (1977), Chapter 5, pages 149 to 169.

The silver halide may be prepared beforehand and then added to a thermally reducible composition containing an organic silver salt.

Alternatively, a halide salt, preferably a bromide salt such as LiBr, NaBr, KBr and NH$_4$Br, can be added to thermally reducible composition containing an organic silver salt. Because of the lower solubility product of silver halide versus the organic silver salt, part of the organic silver salt is then converted into silver halide.

The silver halide grains can vary in average diameter of up to several micrometers. Preferred silver halide grains are those having an average particle size of from 0.01 to 0.5 µm, more preferably an average particle size from 0.01 to 0.15 µm.

The silver halide is preferably be employed in a range of 0.75 to 25 mol percent and, preferably, from 2 to 20 mol percent of the organic silver salt.

Binders

The presence of a binder in the thermally reducible composition is optional. However, if the thermally reducible composition is deposited on a glass surface, then a binder, preferably a film-forming binder, should be present.

The film-forming binder of the thermally reducible composition may be all kinds of natural, modified natural or synthetic resins or mixtures of such resins, in which the organic metal salt, preferably the organic silver salt, can be dispersed homogeneously either in aqueous or solvent media: e.g. cellulose derivatives, starch ethers, galactomannan, polymers derived from alpha, beta-ethylenically unsaturated compounds such as polyvinyl chloride, after-chlorinated polyvinyl chloride, copolymers of vinyl chloride and vinylidene chloride, copolymers of vinyl chloride and vinyl acetate, polyvinyl acetate and partially hydrolyzed polyvinyl acetate, polyvinyl alcohol, polyvinyl acetals that are made from polyvinyl alcohol as starting material in which only a part of the repeating vinyl alcohol units may have reacted with an aldehyde, preferably polyvinyl butyral, copolymers of acrylonitrile and acrylamide, polyacrylates, polymethacrylates, polystyrene and polyethylene or mixtures thereof.

Suitable water-soluble film-forming binders are: polyvinyl alcohol, polyacrylamide, polymethacrylamide, polyacrylic acid, polymethacrylic acid, polyvinylpyrrolidone, polyethyleneglycol, proteinaceous binders, polysaccharides and water-soluble cellulose derivatives.

The binder to the organic metal salt, preferably organic silver salt, weight ratio is preferably in the range of 0.2 to 7.

For high resolution inkjet printing, e.g with piezo print heads, the binder is preferably to a large degree extent absent, in order not to disturb jetting performance.

Tone Modifying Agents

In order to obtain a neutral black tone a so-called tone modifying agent is used in admixture with the organic metal salt(s) and reducing agent(s).

Examples of toners include, but are not limited to, phthalimide and N-hydroxyphthalimide, cyclic imides (such as succinimide), pyrazoline-5-ones, quinazolinone, 1-phenylurazole, 3-phenyl-2-pyrazoline-5-one, and 2,4-thiazolidinedione, naphthalimides (such as N-hydroxy-1,8-naphthalimide), cobalt complexes [such as hexaaminecobalt(3+) trifluoroacetate], mercaptans (such as 3-mercapto-1,2,4-triazole, 2,4-dimercaptopyrimidine, 3-mercapto-4,5-diphenyl-1,2,4-triazole and 2,5-dimercapto-1,3,4-thiadiazole), N-(aminomethyl)aryldicarboximides (such as (N,N-dimethylaminomethyl)phthalimide), and N-(dimethylaminomethyl)naphthalene-2,3-dicarboximide, a combination of blocked pyrazoles, isothiuronium derivatives, merocyanine dyes {such as 3-ethyl-5-[(3-ethyl-2-benzothiazolinylidene)-1-methyl-ethylidene]-2-thio-2,4-o-azolidinedione}, phthalazinone and phthalazinone derivatives, or metal salts or these derivatives [such as 4-(1-naphthyl)phthalazinone, 6-chlorophthalazinone, 5,7-dimethoxyphthalazinone, and 2,3-dihydro-1,4-phthalazinedione], a combination of phthalazine (or derivative thereof) plus one or more phthalic acid derivatives (such as phthalic acid, 4-methylphthalic acid, 4-nitrophthalic acid, and tetrachlorophthalic anhydride), quinazolinediones, benzoxazine or naphthoxazine derivatives, benzoxazine-2,4-diones and naphthoxazine diones (such as 1,3-benzoxazine-2,4-dione, 8-methyl-1,3-benzoxazine-2,4-dione, 3,4-dihydro-2,4-dioxo-1,3,2H-benzoxazine, 3,4-dihydro-2,4-dioxo-1,3,7-ethylcarbonatobenzoxazine, and 6-nitro-1,3-benzoxazine-2,4-dione), pyrimidines and asym-triazines (such as 2,4-dihydroxypyrimidine, 2-hydroxy-4-aminopyrimidine and azauracil) and tetraazapentalene derivatives [such as 3,6-dimercapto-1,4-diphenyl-1H,4H-2,3a,5,6a-tetraazapentalene and 1,4-di-(o-chlorophenyl)-3,6-dimercapto-1H,4H-2,3a,5,6a-tetraazapentalene].

Preferred tone modifying agents are selected from the group consisting of succinimides, phthalimides, phthalazinones, combinations of phtalazines and one or more phthalic acid derivatives, pyridazones, benzoxazine diones and naphthoxazine diones.

The synergetic effect of a combination of two toning agents, according to the present invention, or one toning agent according to the present invention, together with a further toning agent, such as benzoxazine dione, a benzoxazine dione derivative, phthalazinone, a phthalazinone derivative, pyridazone or a pyridazone derivative, in obtaining a more neutral image tone than would be expected by additive combination of the image tone obtained with the toning agents separately may, we believe, be due to combining toning agents which exhibit good silver nanoparticle-aggregating properties but have very different diffusion coefficients.

Reducing Agents

The reducing agent for the organic metal salt is a compound or a set of compounds that can reduce the metal ion of the organic metal salt to its metallic form. More preferably the reducing agent is a compound or a set of compounds that can reduce the silver (1+) ion to metallic silver.

Suitable reducing agents include aromatic di- and tri-hydroxy compounds (such as hydroquinones, gallatic acid and gallic acid derivatives, catechols, and pyrogallols), aminophenols (for example, N-methylaminophenol), p-phenylenediamines, alkoxynaphthols (for example, 4-methoxy-1-naphthol), pyrazolidin-3-one type reducing agents (for example PHENIDONE™), pyrazolin-5-ones, polyhydroxy spiro-bis-indanes, indan-1,3-dione derivatives, hydroxytetrone acids, hydroxytetronimides, hydroxylamine derivative, hydrazine derivatives, hindered phenols, amidoximes, azines, and reductones (for example, ascorbic acid and ascorbic acid derivatives).

When a silver benzotriazole salt is used, ascorbic acid reducing agents are preferred. Suitable ascorbic acid developing agents include ascorbic acid and the analogues, isomers and derivatives thereof. Such compounds include, but are not limited to, D- or L-ascorbic acid, sugar-type derivatives thereof (such as sorboascorbic acid, [gamma]-lactoascorbic acid, 6-desoxy-L-ascorbic acid, L-rhamnoascorbic acid, imino-6-desoxy-L-ascorbic acid, glucoascorbic acid, fucoascorbic acid, glucoheptoascorbic acid, maltoascorbic acid, L-arabosascorbic acid), sodium ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid.

When a silver carboxylate salt is used as organic metal salt in a STR type thermally reducible composition, hindered phenol reducing agents are preferred.

"Hindered phenol reducing agents" are compounds that contain only one hydroxy group on a given phenyl ring and have at least one additional substituent located ortho to the hydroxy group. Hindered phenol reducing agents may contain more than one hydroxy group as long as each hydroxy group is located on different phenyl rings. Hindered phenol reducing agents include, for example, binaphthols (that is dihydroxybinaphthyls), biphenols (that is dihydroxybiphenyls), bis(hydroxynaphthyl)methanes, bis(hydroxyphenyl)

methanes (that is bisphenols), hindered phenols, and hindered naphthols, each of which may be variously substituted.

Representative binaphthols include, but are not limited to 1,1'-bi-2-naphthol, 1,1'-bi-4-methyl-2-naphthol and 6,6'-dibromo-bi-2-naphthol.

Representative biphenols include, but are not limited to 2,2'-dihydroxy-3,3'-di-t-butyl-5,5-dimethylbiphenyl, 2,2'-dihydroxy-3,3',5,5'-tetra-t-butylbiphenyl, 2,2'-dihydroxy-3,3'-di-t-butyl-5,5'-dichlorobiphenyl, 2-(2-hydroxy-3-t-butyl-5-methylphenyl)-4-methyl-6-n-hexylphenol, 4,4'-dihydroxy-3,3',5,5'-tetra-t-butylbiphenyl and 4,4'-dihydroxy-3,3',5,5'-tetramethylbiphenyl.

Representative bis(hydroxynaphthyl)methanes include, but are not limited to, 4,4'-methylenebis(2-methyl-1-naphthol).

Representative bis(hydroxyphenyl)methanes include, but are not limited to, bis(2-hydroxy-3-t-butyl-5-methylphenyl) methane (CAO-5), 1,1'-bis(2-hydroxy-3,5-dimethylphenyl)-3,5,5-trimethylhexane (NONOX™ or PERMANAX™ WSO), 1,1'-bis(3,5-di-t-butyl-4-hydroxyphenyl)methane, 2,2'-bis(4-hydroxy-3-methylphenyl)propane, 4,4'-ethylidene-bis(2-t-butyl-6-methylphenol), 2,2'-isobutylidene-bis (4,6-dimethylphenol) (LOWINOX™ 221B46), and 2,2'-bis (3,5-dimethyl-4-hydroxyphenyl)propane.

Representative hindered phenols include, but are not limited to, 2,6-di-t-butylphenol, 2,6-di-t-butyl-4-methylphenol, 2,4-di-t-butylphenol, 2,6-dichlorophenol, 2,6-dimethylphenol and 2-t-butyl-6-methylphenol.

Representative hindered naphthols include, but are not limited to, 1-naphthol, 4-methyl-1-naphthol, 4-methoxy-1-naphthol, 4-chloro-1-naphthol and 2-methyl-1-naphthol.

Mixtures of hindered phenol reducing agents can be used if desired, or combinations with substituted hydrazines including sulfonyl hydrazides are also preferred.

Still another useful class of reducing agents are polyhydroxy spiro-bis-indane compounds. Examples include 3,3,3',3'-tetramethyl-5,6,5',6'-tetrahydroxy-1,1'-spiro-bis-indane (called indane I) and 3,3,3',3'-tetramethyl-4,6,7,4',6',7'-hexahydroxy-1,1'-spiro-bis-indane (called indane II).

When a silver carboxylate salt is used as an organic metal salt in a ITR type thermally reducible composition, preferred reducing agents include catechol-type reducing agents, i.e. reducing agents containing at least one benzene nucleus with two hydroxy groups (—OH) in ortho-position. Particularly preferred are: catechol, 3-(3,4-dihydroxyphenyl) propionic acid, 1,2-dihydroxybenzoic acid, gallic acid and esters e.g. methyl gallate, ethyl gallate, propyl gallate, tannic acid, and 3,4-dihydroxy-benzoic acid esters. Particularly preferred catechol-type reducing agents are benzene compounds in which the benzene nucleus is substituted by no more than two hydroxy groups which are present in 3,4-position on said nucleus and have in the 1-position of said nucleus a substituent linked to said nucleus by means of a carbonyl group.

Particularly preferred reducing agents a silver carboxylate salt used as an organic metal salt in a ITR type thermally reducible composition are 1,2-dihydroxy-benzene derivatives, such as catechol, 3-(3,4-dihydroxyphenyl) propionic acid, 1,2-dihydroxybenzoic acid, gallic acid and esters e.g. methyl gallate, ethyl gallate, propyl gallate, ethyl 3,4-dihydroxybenzoate, n-butyl 3,4-dihydroxybenzoate, 3,4-dihydroxy-benzaldehyde, 3,4-dihydroxy-acetophenone, 3,4-butyrophenone, 3,4-dihydroxy-benzophenone, 3,4-dihydroxybenzophenone derivatives, 3,4-dihydroxy-benzonitrile, and tannic acid.

The optical density depends on the coverage of the above defined reducing agent(s) and organic metal salt(s) and has to be preferably such that, on heating above 100° C., an optical density of at least 3.0 can be obtained. Preferably at least 0.10 moles of reducing agent per mole of organic metal salt is used.

Stabilizers

The thermally reducible composition may further contain a stabilizer.

Preferred stabilizers are selected from the group consisting of benzotriazole; substituted benzotriazoles; aromatic polycarboxylic acid, such as ortho-phthalic acid, 3-nitro-phthalic acid, tetrachlorophthalic acid, glutaric acid, mellitic acid, pyromellitic acid and trimellitic acid and anhydrides thereof; 1-phenyl-5-mercaptotetrazole compounds in which the phenyl group is substituted with a substituent containing an optionally substituted aryl group, 1-(5-mercapto-1-tetrazolyl)-acetyl compounds.

In a ITR type thermally reducible composition, preferably at least one optionally substituted aliphatic or carbocyclic polycarboxylic acid and/or anhydride thereof is present in a molar percentage of at least 5 or even 15 with respect to the organic metal salt. The polycarboxylic acid may be used in anhydride form or partially esterified.

Inkjet Printing

Although there is no limitation to the application technique of the thermally reducible composition, e.g. screen printing or flexographic printing may be used, a preferred application technique is inkjet printing.

The thermally reducible composition may be jetted by one or more print heads ejecting small droplets in a controlled manner through nozzles onto a glass surface or a thermoplastic polymeric surface, which is moving relative to the print head(s).

A preferred print head for the inkjet printing system is a so-called valve jet print head, especially if the thermally reducible composition includes a high amount of polymeric binder, such as polyvinylbutyral. Preferred valve jet print heads have a nozzle diameter between 45 and 600 µm. This allows for a resolution of 15 to 150 dpi which is preferred for having high productivity while not comprising image quality.

The way to incorporate valve jet print heads into an inkjet printing device is well-known to the skilled person. For example, US 2012105522 (MATTHEWS RESOURCES INC)) discloses a valve jet printer including a solenoid coil and a plunger rod having a magnetically susceptible shank.

Suitable commercial valve jet print heads are Chromo Jet™ 200, 400 and 800 from Zimmer and Printos™ P16 from VideoJet.

In a preferred embodiment, the inkjet printing device includes one or more valve jet print heads.

The valve jet print head preferably jets droplets of 1 to 1500 nanoliter, which is much more than the picoliter droplets used jetted most piezoelectric or thermal inkjet printing systems. Another consequence is that higher viscosities of the thermally reducible composition can be handled, for example, a substantial amount of a thermoplastic polymer like polyvinylbutyral can be included, contrary to e.g. piezo inkjet print heads.

The inkjet print head normally scans back and forth in a transversal direction across the moving glass surface or thermoplastic polymeric surface. Bi-directional printing, also called multi-pass printing, is preferred for obtaining a high areal throughput. Another preferred printing method is by a "single pass printing process", which can be performed by using page wide inkjet print heads or multiple staggered inkjet print heads which cover the entire width of the glass surface or thermoplastic polymeric surface.

In a preferred embodiment, the resolution of the print head is 15 to 150 dpi, preferably the resolution is no more than 75 dpi, more preferably no more than 50 dpi for maximizing printing speed and productivity. Valve jet print heads allowing variable dots or having multiple resolutions can also be advantageously used to enhance image quality further.

The throwing distance of the thermally reducible composition droplets is preferably between 1 and 50 mm, more preferably between 3 and 30 mm for maximizing image quality.

If the thermally reducible composition contains no or only a small amount of polymeric binder, then preferably piezoelectric printheads are used. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

EXAMPLES

Materials

All compounds and solvents were readily available from fine chemical suppliers such as ACROS or ALDRICH unless otherwise specified. The water used was demineralized water.

S Lec™ BLHPz is a polyvinyl butyral polymer supplied by SEKISUI.

S Lec™ BX-35Z is a polyvinyl butyral polymer supplied by SEKISUI.

Baysilon™ Paint Additive MA is a silicone based coating additive supplied by BORCHERS.

Tone modifier 1 was prepared according to GB 1160419:

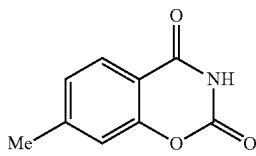 [SMILES: Cc1ccc2c(=O)[nH]c(=O)oc2c1]

Tone modifier 1

Stabilizer 1 was obtained from Chemosyntha:

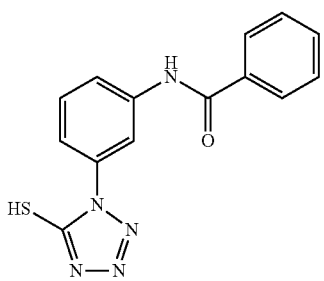 [SMILES: O=C(Nc1cccc(-n2nnnc2S)c1)c1ccccc1]

Stabilizer 1.

Stabilizer 2 was supplied by Aldrich:

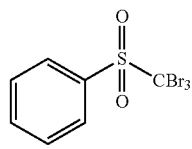

Stabilizer 2.

Reductor 1 is a catechol type reductor obtained from ACROS:

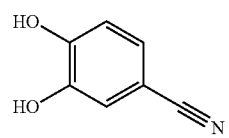

Reductor 1.

Reductor 2 is a catechol type reductor obtained from ACROS:

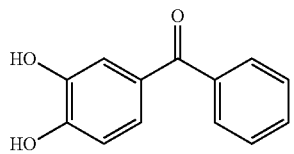 [SMILES: O=C(c1ccccc1)c1ccc(O)c(O)c1]

Reductor 2.

Desmodur™ VL is an aromatic polyisocyanate based on diphenylmethane diisocyanate from Bayer Material Science.

Lowinox™ 22BI46 is a reducing agent supplied by Chemtura, having the following structure:

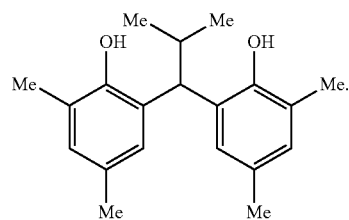

Measurement Methods

1. Optical Density

The optical density was measured using a Macbeth TR924 densitometer.

2. Surface Temperature

The surface temperature of the heating plate was measured using a Testo™ 825-T2 measuring device.

3. Adhesion

The adhesion was tested using inner and outer glass layers having a thickness of 0.7 mm. A knife was positioned between the inner and outer glass layers of a laminated safety glass and it was tried to separate the glass layers.

An evaluation was made in accordance with a criterion described in Table 2.

TABLE 2

| Score | Criterion |
|---|---|
| OK | No separation possible. The glass breaks. |
| Not OK | The inner and outer glass layers can be separated from each other |

Example 1

This example illustrates the manufacturing of laminated safety glass using a substantially light insensitive thermally reducible composition (ITR).

Preparation of Organic Silver Salt Dispersion DISP-1

Behenic acid was added to 800 mL of 2-butanone in a 5 L vessel and the dispersion heated with stirring at 350 rpm to 70° C. giving a clear solution. 1.1 L of 0.75M aqueous sodium hydroxide was added slowly until a pH of 9.9 was attained, then after 5 minutes further stirring 1 L of 0.8M aqueous silver nitrate was added at a constant rate of ca. 260 mL/h until a UAg (defined as the potential difference between a silver electrode of 99.99% purity in the aqueous liquid and a reference electrode consisting of a Ag/AgCl-electrode in 3M KCl solution at room temperature connected with the aqueous liquid via a salt bridge consisting of a 10% $KNO_3$ salt solution) of 315 mV was attained, thereby producing a 12% dispersion of organic silver salt. The organic silver salt was then filtered off and washed four times with deionized water with 2% of 2-propanol, after which it was dried for 72 hours at 45° C.

A dispersion DISP-1 of in 2-butanone was prepared according to the following procedure.

A predispersion containing 34.8% by weight of silver behenate and 5.2% by weight of S Lec™ BL5HPz in 2-butanone was prepared using a KOWLESS stirrer. The predispersion was further diluted with 2-butanone to 26.1% by weight of silver behenate and subjected to pearl milling (bead diameter=0.65 mm) for 9 minutes in a circulating system pumped at 300 rpm, followed by pearl milling for 30 minutes in a circulating system pumped at 500 rpm. A 11.4% solution by weight of S Lec™ BL5HPz in 2-butanone was added resulting in a dispersion containing 20.5% by weight of silver behenate and 5.5% by weight of S Lec™ BL5HPz, which was pumped into a production vessel. An 11.4% by weight S Lec™ BL5HPz solution in 2-butanone was added in two portions each time followed by 1 minute pearl milling in a circulating system resulting in a stable dispersion containing 13.0% by weight of silver behenate and 7.66% by weight of S Lec™ BL5HPz.

Preparation of Thermally Reducible Composition ITR-1

The silver behenate dispersion DISP-1 was used to prepare a thermally reducible composition ITR-1 according to Table 3.

TABLE 3

| g of compound: | ITR-1 |
|---|---|
| silver behenate | 10 |
| S Lec ™ BL5HPz | 8.5 |
| S Lec ™ BX-35Z | 26.9 |
| Tone modifier 1 | 0.59 |
| Baysilon ™ Paint Additive MA | 0.08 |
| Stabilizer 1 | 0.13 |
| glutaric acid | 0.78 |
| Reductor 1 | 1.66 |
| Reductor 2 | 2.63 |

TABLE 3-continued

| g of compound: | ITR-1 |
|---|---|
| Tetrachloro phtalic anhydride | 0.38 |
| benzotriazole | 0.13 |
| Desmodur ™ VL | 0.48 |
| 2-butanone | 150 |

Preparation of Laminated Safety Glass SG-1

The thermally reducible composition ITR-1 was applied on 0.7 mm thick glass sheets (Menzel-Glaser, supplied by Thermo Scientific). The thermally reducible composition ITR-1 was coated twice using a 200 μm bar with intermediate drying. The coating was fully dried and a clear polyvinyl butyral sheet (Butacite™ B52 supplied by DUPONT) was sandwiched between the two coated glass plates with the coated side in contact with the polyvinyl butyral sheet.

Evaluation and Results

Samples of the above prepared laminated safety glass SG-1 were given different thermal treatments.

Sample SG-1A was heated for 20 seconds on a heating plate, having a temperature of 185° C.

Sample SG-1B was heated in an oven at a temperature of 172° C. for 90 seconds.

Sample SG-1C was heated in an oven at a temperature of 200° C. for 90 seconds.

Sample SG-1D was heated in an oven at a temperature of 130° C. for 5 minutes.

The results of visually evaluated image tone and the measured optical density are shown in Table 4.

TABLE 4

| Sample | Temp/Time | Image tone | Optical density | Adhesion |
|---|---|---|---|---|
| SG-1A | 185° C./20 s | black | 4.7 | OK |
| SG-1B | 172° C./90 s | black | 4.0 | OK |
| SG-1C | 200° C./90 s | black | >6.0 | OK |
| SG-1D | 130° C./5 min | brownish black | 3.5 | OK |

From Table 4, it should be clear that high optical densities of at least 3.5 and possessing neutral black color could be obtained. Such a result was found to be impossible to obtain with commercial black inkjet inks containing a black pigment, such as carbon black, without causing problems of adhesion between the interlayer and the glass layer at the printed area.

Example 2

This example illustrates the manufacturing of laminated safety glass using a light sensitive thermally reducible composition (STR).

Preparation of Thermally Reducible Composition STR-1

The silver behenate dispersion DISP-1 was used to prepare the thermally reducible composition STR-1 and STR-2 according to Table 5. The addition of the tetraethyl ammonium bromide resulted in a conversion of silver behenate to the light sensitive silver bromide.

TABLE 5

| g of compound: | STR-1 | STR-2 |
|---|---|---|
| silver behenate | 10.00 | 10.00 |
| tetraethyl ammonium bromide | 0.42 | 0.42 |
| phtalazine | 0.63 | — |
| 4-methylphtalic acid | 0.25 | — |
| Stabilizer 1 | 0.63 | 0.63 |
| phtalazinone | — | 0.50 |
| Lowinox 22BI46 | 3.13 | 3.13 |
| S Lec ™ BL5HPz | 8.50 | 8.50 |
| S Lec ™ BX-35Z | 14.20 | 14.20 |
| 2-butanone | 88.50 | 88.50 |

Preparation of Laminated Safety Glass SG-2 and SG-3

The thermally reducible composition STR-1 and STR-2 were applied on 0.7 mm thick glass sheets (Menzel-Glaser, supplied by Thermo Scientific). The thermally reducible compositions were coated twice using a 200 µm bar with intermediate drying. The coating was fully dried and a clear polyvinyl butyral sheet (Butacite™ B52 supplied by DUPONT) was sandwiched between the two coated glass plates with the coated side in contact with the polyvinyl butyral sheet. A laminated safety glass SG-2 and SG-3 were obtained using the thermally reducible compositions STR-1 respectively STR-2.

Evaluation and Results

Samples of the above prepared laminated safety glasses SG-2 and SG-3 were given different thermal treatments. SG-2 was heated in an oven for 5 minutes at 130° C., while SG-3 was heated in an oven for 3 minutes at 130° C. Another sample of SG-2 was heated in an oven for 20 seconds minutes at 200° C.

The results of visually evaluated image tone and the measured optical density are shown in.

TABLE 6

| Sample | Temp/Time | Image tone | Optical density | Adhesion |
|---|---|---|---|---|
| SG-2 | 130° C./5 min | brownish black | 3.5 | OK |
| SG-3 | 130° C./3 min | brownish black | 3.5 | OK |
| SG-2 | 200° C./20 s | brownish black | 4.3 | OK |

By comparing the thermal treatment conditions, it can be seen from Table 6, that the laminated safety glasses SG-2 and SG-3, including a silver halide, are more reactive than the laminated safety glass SG-1 in Example 1. The possibility to choose between an ITR or a STR type composition allows to cover a wide range of heat treatment conditions whereby easy implementation in manufacturing plants of laminated safety glass becomes possible. Again adhesion results were found to be superior to those obtained by printing a commercial black inkjet ink containing a carbon black to high density.

REFERENCE SIGNS LIST

TABLE 7

| 1 | Windshield |
|---|---|
| 2 | Laminated glass |
| 3 | UV light blocking border |
| 4 | UV light blocking area |
| 5 | Central part of the windshield |
| 21 | Inner glass layer |
| 22 | Interlayer |
| 23 | Outer glass layer |
| 24 | Vehicle frame |
| 25 | Enamel UV light blocking border |
| 26 | Adhesive |
| 27 | Acid rain penetration |
| 28 | Rubber seal |
| 31 | Raw glass |
| 32 | Marking up & cutting |
| 33 | Enamel ink printed inner glass layer |
| 34 | Cleaning |
| 35 | Furnace |
| 36 | Bent outer glass layer |
| 37 | Interlayer |
| 38 | Bent enamel ink printed inner glass layer |
| 39 | Autoclave |
| 40 | Cleaning |
| 41 | Ready-to-use windshield |
| 42 | Flat windshield shaped glass layer |
| 43 | Printed interlayer |
| 44 | Bent unprinted inner glass layer |
| 45 | Enamel ink printing |
| 46 | Layer of thermally reducible composition |
| 47 | Functional conductive pattern |

The invention claimed is:

1. A method for manufacturing laminated safety glass comprising the steps of:
   applying imagewise a thermally reducible composition including an organic metal salt on a surface selected from the group consisting of a glass surface and a thermoplastic polymeric surface;
   heating at least the imagewise applied thermally reducible composition to form a metal from the organic metal salt; and
   during the heating step, laminating an assembly including, in order, an inner glass layer, an interlayer including the thermoplastic polymeric surface, and an outer glass layer; wherein
   the organic metal salt is dispersed in the thermally reducible composition;
   the thermally reducible composition does not contain a colorant; and
   the thermally reducible composition is in direct contact with the thermoplastic polymeric surface of the interlayer.

2. The method according to claim 1, wherein the step of applying imagewise the thermally reducible composition includes applying the thermally reducible composition by inkjet printing.

3. The method according to claim 1, wherein the organic metal salt is an organic silver salt.

4. The method according to claim 3, wherein the organic silver salt is selected from the group consisting of silver behenate, silver stearate, silver palmitate, silver laurate, or mixtures therewith.

5. The method according to claim 3, wherein the thermally reducible composition includes silver halide.

6. The method according to claim 1, wherein the thermally reducible composition includes a tone modifying agent selected from the group consisting of succinimides, phthalimides, phthalazinones, combinations of phtalazines and one or more phthalic acid derivatives, pyridazones, benzoxazine diones, and naphthoxazine diones.

7. The method according to claim 1, wherein the thermally reducible composition includes a polyvinylbutyral.

8. The method according to claim 1, wherein the thermoplastic polymeric surface is selected from the group consisting of a polyvinylbutyral surface, a poly(ethylene-co-vinyl acetate) surface, and a thermoplastic polyurethane surface.

9. The method according to claim 1, wherein the thermally reducible composition is applied on the glass surface of the inner glass layer or the outer glass layer that makes contact with the interlayer.

* * * * *